United States Patent Office 3,328,937
Patented July 4, 1967

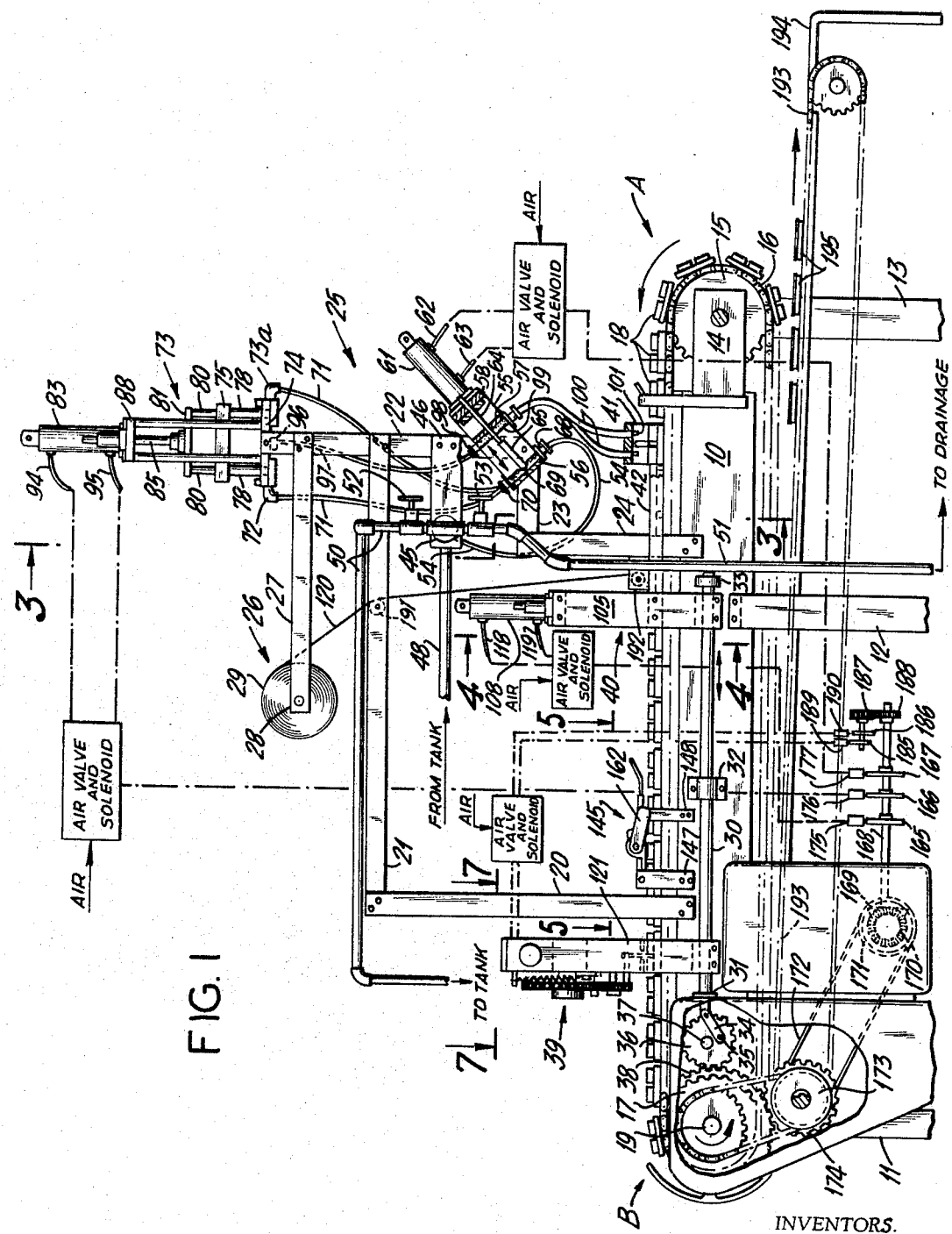

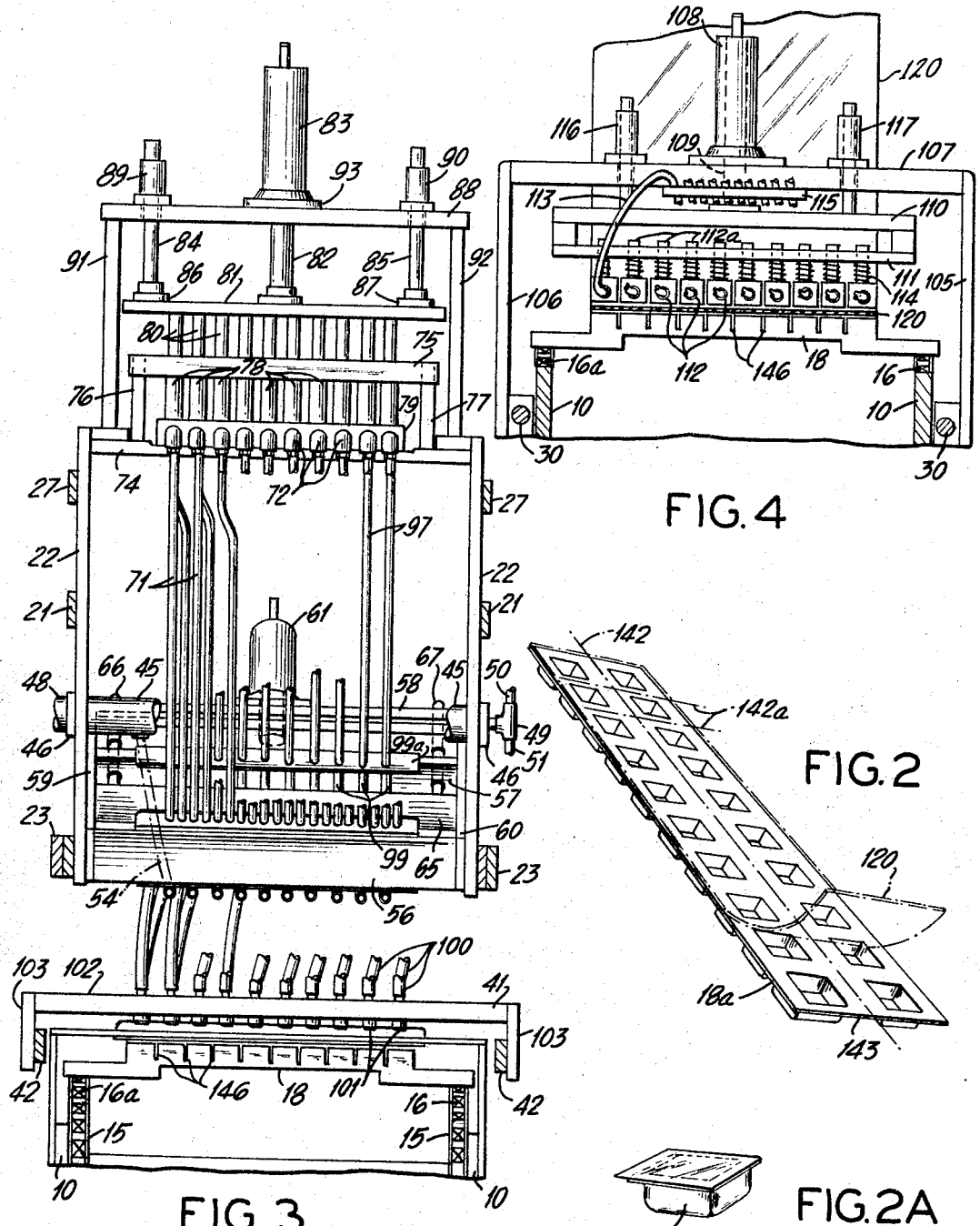

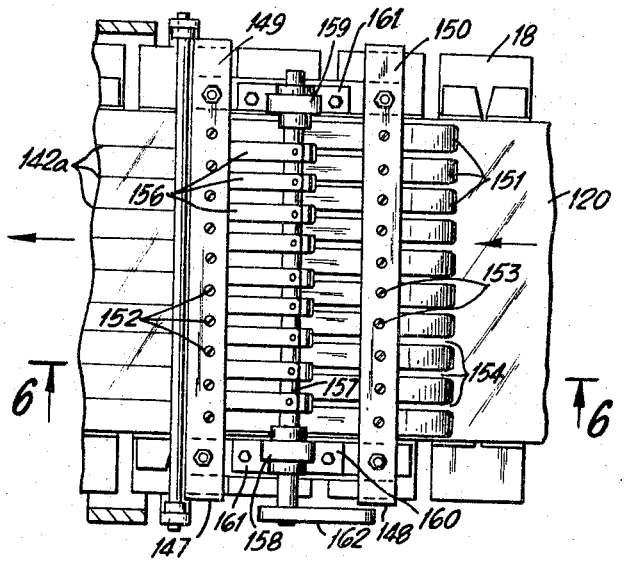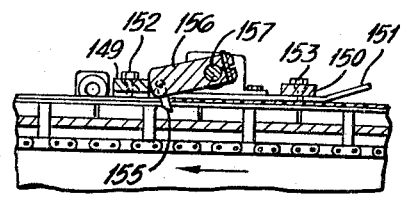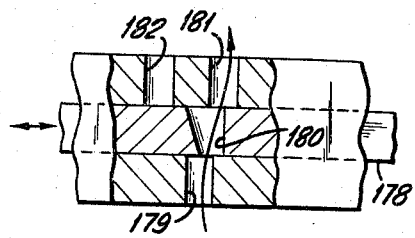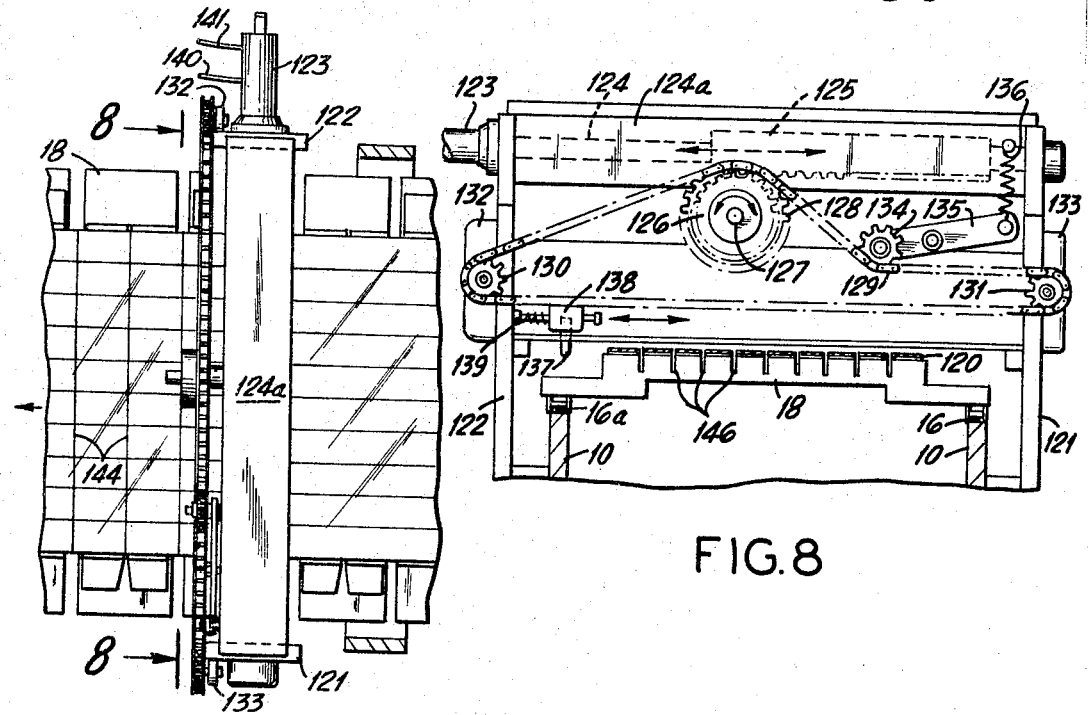

3,328,937
DEVICE FOR CONTINUOUSLY FEEDING AND PACKAGING FLOWABLE SUBSTANCES
Ellis Newman, Rockville Centre, and William Price, New Hyde Park, N.Y., assignors to Unit Portions, Inc., West Hempstead, N.Y., a corporation of New York
Filed Oct. 14, 1964, Ser. No. 403,744
5 Claims. (Cl. 53—282)

ABSTRACT OF THE DISCLOSURE

A device is disclosed for continuously feeding and packaging flowable substances, the device having an endless conveyor supported by a frame. A reciprocable carriage is mounted on the frame, the carriage having mounted on it a feeding head for feeding the flowable substance to a package supported by the conveyor and also having a heat sealing assembly spaced forwardly of the feeder for applying and sealing a cover on the package. A feeding assembly supported by the frame is coupled to the feeding head, the feeding assembly comprising a reservoir for confining flowable substance therein. A measuring device is coupled to the reservoir and has valve means associated therewith for charging and discharging substance to and from the measuring device. Means for actuating the feeding assembly and the sealing assembly in timed relationship with the reciprocable carriage is provided.

---

This invention relates to a device for continuously feeding and packaging flowable substances and, in particular, to a device for feeding and packaging measured unit portions of edible substances, such as jellies, catsup, drugs, pharmaceuticals, and the like, in the fluid state, or fluid non-comestibles, such as cosmetic creams, or the like substances.

Recent trends in the efficient serving of food, whether in flight during air travel, or in large institutions such as schools or hospitals, or in commercial restaurants have given rise to the desirability of having certain comestibles, such as jellies, gelatins, catsup, mayonnaise, butter, and the like, available in unit packages for immediate service with the meal without resorting to time-consuming on-the-spot preparation.

Devices are known for automatically feeding and packaging flowable substances. Generally, such devices utilize an intermittently driven endless conveyor in conjunction with a stationarily positioned feeding station, sealing station, and a severing station for separating flange-connected unit packages.

We provide a new and improved device in which the conveyor moves continuously to and past the various stations without stopping, the various stations being mounted on a reciprocable carriage which reciprocates forwardly and backwardly relative to the frame supporting the moving conveyor, the forward movement being substantially in synchrony with the forward movement of the continuously moving conveyor.

It is an object of our invention to provide a device for filling and sealing small unit packages with flowable substances.

Another object is to provide a device for feeding measured amounts of a liquid to a filling station having a bank of nozzles wherein each nozzle simultaneously receives a measured amount of said liquid for feeding into a package.

A further object is to provide a device having a continuously moving conveyor and a reciprocable carriage associated therewith supporting feeding nozzles, a sealing station and a severing station.

These and other objects will more clearly appear when taken in conjunction with the following disclosure and the accompanying drawings, wherein:

FIG. 1 is a side elevation of one embodiment of our device showing a frame supporting an endless conveyor with a reciprocable carriage above;

FIG. 2 is illustrative of a plastic tray made up of a plurality of flange-connected cups employed in the production of unit packages;

FIG. 2A is a unit package produced from the plastic tray of FIG. 2;

FIG. 3 shows a feeding assembly as viewed in front elevation along line 3—3 of FIG. 1;

FIG. 4 shows in front elevation the details of the sealing assembly as viewed along line 4—4 of FIG. 1;

FIG. 5 is a plan view of the slitting assembly as viewed along line 5—5 of FIG. 1;

FIG. 6 is a cross section of a portion of the slitting assembly as taken along line 6—6 of FIG. 5;

FIG. 7 depicts in plan view the cutting assembly as viewed along line 7—7 of FIG. 1;

FIG. 8 is an elevation of the cutting assembly of FIG. 7 as viewed along line 8—8; and FIG. 9 is a fragmentary view of a pneumatic valve employed in conjunction with pneumatic cylinders for effecting several of the operational steps.

In carrying out a preferred embodiment of our invention, we provide a device comprising a frame having an endless conveyor supported therein, the conveyor extending from a charging station at one end of said frame to the end opposite thereof and back to a discharge station below said charging station. A reciprocable carriage is provided mounted on the frame, the carriage having mounted above the conveyor starting at the charging station a multi-nozzle feeding head for feeding flowable substance to flange-connected packages supported by the conveyor. A heat sealing assembly is likewise mounted on the carriage spaced forwardly of the feeder for applying and sealing a cover or lid on the flange-connected packages in addition to a cutting assembly spaced forwardly of the sealing assembly for severing said packages into unit packages by cutting through their flanges.

The frame supports a feeding assembly comprising, a reservoir for confining flowable substance therein, a bank of feeding tubes communicating with and extending from the reservoir, a portion of each of the tubes being made of collapsible elastomeric material and a measuring device comprising a bank of volumetric cylinders and associated pistons, each of the cylinders having an inlet port and an outlet port. Means are provided connecting the bank of feeding tubes to corresponding inlet ports of the cylinders, in addition to means connecting a bank of discharge tubes to corresponding outlet ports of the cylinders, a portion of each of the tubes being made of collapsible elastomeric material disposed opposite to the collapsible portions of the bank of feeding tubes. The ends of the bank of discharge tubes are coupled to a corresponding bank of discharge nozzles of the feeding head, with a shuttle bar located intermediate the collapsible portions of the banks of feeding tubes and discharge tubes.

Means are provided for actuating the shuttle bar for clamping and closing off either of the bank of collapsible portions of the feeding tubes or the discharge tubes. The measuring device is actuated by means for drawing flowable substance into the bank of volumetric cylinders through the inlet ports thereof and for expelling the same through the outlet ports. In sealing the packages, heat sealing shoes are provided in the heat sealing assembly, the apparatus being provided with means for actuating the cutter assembly, and means for actuating the feeding assembly, the sealing assembly and the cutting assembly in timed relationship with the backward and forward movement of the carriage.

Referring to FIG. 1, the frame of the device comprises spaced apart side plates 10 longitudinally disposed as shown and joined by transverse structural members hidden from view, the frame being supported by legs 11, 12 and 13. An extension 14 is provided at the right end of the frame of FIG. 1, for supporting a sprocket 15 about which an endless chain conveyor 16 travels. Another sprocket 17 is provided at the opposite end of the frame for supporting the chain conveyor. The conveyor comprises in effect a pair of parallel endless chains 16 and 16a (note FIG. 4) across which a plurality of molds 18 are mounted transversely (note FIGS. 1, 3 and 4), each of the molds being made up, for example, of a bank of twenty cavities adapted to receive and support a twenty-cavity plastic tray 18a shown in FIG. 2 from which the unit packages, e.g. 18b (FIG. 2A), are finally produced.

The driving of the conveyor is effected by motor (not shown) coupled via a belt or gear to shaft 19, with the shaft rotating in the direction shown by the arrows such that the conveyor moves from the charging end at which sprocket gear 15 is located to the forward end of the frame about sprocket 17 and back to a discharge end which lies below the charging end.

A superstructure is provided connected to the frame and rising upwardly therefrom comprising a vertical member 20 fixed to plate 10, it being understood that another member 20 appears on the other side of the frame similarly supported, both members being fixed to a pair of horizontal members 21, the end of which is connected to a vertical member 22 which in turn is rigidly connected to the frame via a horizontal structural member 23 and a short vertical leg 24 bolted to plate 10. The superstructure supports a feeding assembly referred to generally by the designation 25, and also supports means 26 for dispensing a plastic web for sealing the packages, the means comprising a cantilever 27 fixed to vertical member 22 and supporting at its free end 28 a roll of plastic web 29.

The frame in turn also supports a reciprocable carriage comprising a reciprocating bar 30 slidingly mounted via supports 31, 32 and 33 fixed to plate 10. The bar is connected via a pivotally mounted link 34 to an eccentrically located pivot 35 on gear 36 keyed to a rotatable shaft 37. The gear meshes with a drive gear 38 keyed to rotatable shaft 19. As gear 36 rotates, bar 30 reciprocates in a forwardly and backwardly movement. Fixed to the bar is a cutting assembly 39 and a heat sealing assembly 40, the heat sealing assembly also rigidly supporting a multi-nozzle feeding head 41 by means of structural member 42 which is shown partially broken away and in cross section in FIG. 3. Details as to these parts are more clearly indicated in FIGS. 3, 4, and 8 to be described later.

Referring first to feeding assembly 25 supported by the superstructure as shown in FIGS. 1 and 3, a manifold or reservoir 45 is supported between and passes through horizontal members 46 (note FIG. 3), the end 47 being connected to a pipe 48 (note FIG. 1) extending from a heating tank (not shown) containing, for example, hot jelly which is fed to the manifold by a suitably pump. The manifold is provided with a T connection 49 at its other end, the T having a feed-back pipe 50 through which excess hot jelly is continuously fed back to the heating tank. A by-pass pipe 51 is provided extending from the T to drainage. Two valves 52, 53 (FIG. 1) are associated with the T so that when jelly is fed from the heating tank to manifold 45 via pipe 48, valve 53 is maintained closed while valve 52 is kept open. However, when the pipe lines are being cleaned, valve 52 is closed and valve 53 opened to allow cleaning fluid to go to drain.

The manifold has a plurality of orifices to each of which a tubing is coupled. Thus, where the mold holding the packaging tray has twenty cavities, twenty orifices are employed in the manifold. The feeding mechanism will be described for one orifice, it being understood that the same applies for all the others.

Referring to FIG. 1, a tubing 54 is shown, for example a stainless steel tubing, extending from manifold 45 to a valve bracket 55 which is mounted at an angle as shown to the superstructure between vertical member 22 and structural member 23 (FIG. 3). The bracket, which is shown partly in cross section (FIG. 1), has transversely positioned plates 56, 57 and 58 held rigidly between side plates 59 and 60 (FIG. 3), which side plates are mounted between vertical members 22. On the face of plate 58 is rigidly mounted a pneumatic cylinder 61 having alternate air inlet ports 62, 63. A reciprocating rod 64 extends from the pneumatic cylinder and passes through transverse plates 58 and 57, the rod having a shuttle bar valve 65 connected at its ends. As shown in FIG. 3, shuttle bar valve 65 runs across the width of the bracket and has guide rods 66 and 67 projecting from each end and extending freely through transverse plates 57 and 58. The purpose of the shuttle bar is to provide means for intermittently feeding jelly or other fluid to the multi-nozzle feeding head as will be apparent hereinafter.

The tube 54 referred to above is coupled by a nipple 68 to the bracket and is coextensive with a rubber tubing 69 within the bracket. The rubber tubing connects via a nipple 70 to tubing 71 which in turn is coupled to an elbow 72. Elbow 72 is connected to an inlet port of a volumetric cylinder and piston combination 73 comprising a base plate 74 running across the width of the frame and rigidly connected to vertical members 22 (FIG. 3). A support plate 75 is located above the base plate and fixed to its via vertical supports 76 and 77. A bank of jelly cylinders 78 extends downwardly from support plate 75 and enters a receiver 79, each of the cylinders communicating with elbows 72 via inlet ports at the base thereof. As shown in FIGS. 1 and 3 there are two rows of jelly cylinders with ten in each row. Each cylinder has a jelly piston 80 associated therewith. Each of the jelly pistons project downwardly from plate 81 which is connected via an air-actuated piston rod 82 to pneumatic cylinder 83. Guide rods 84, 85 are provided connected to plate 81 at 86, 87 and passing through support plate 88 in sliding association with bushings 89 and 90, the support plate being rigidly anchored to base plate 74 by vertical members 91, 92 (FIG. 3). Pneumatic cylinder 83 is fixed to the top of support plate 88 at 93 as shown.

Referring to FIG. 1, elbows 73a are provided communicating with the inlet ports of the second row of jelly cylinders similarly as with elbows 72. Alternate air inlet ports 94, 95 are provided for actuating air piston rod 82 so as to raise or lower jelly pistons 80 within the bank of jelly cylinders 78. As pistons 80 rise in the cylinders, a measured amount of fluid is sucked into the cylinders and on the downward stroke discharged from the cylinders via outlet ports between the rows of cylinders shown in FIG. 1. One such outlet is shown at 96 between elbows 72 and 73a. Extending from the outlet is a tubing 97 which extends to bracket 55 and is nipple-connected at 98 to a rubber tube 99 held against plate 57 via holder 99a. Tube 99 is coextensive with a rubber tube 100 which is connected to nozzle 101. Similarly, other tubes extend downwardly from the bank of cylinders 78 through a corresponding rubber tube in the bracket to their respective nozzles. By moving shuttle bar 65 against either bank of rubber tubings held within the bracket, the fluid may be either lifted into the cylinders or discharged therefrom. Assuming a measured amount of fluid, e.g. hot jelly, is to be discharged at multi-nozzle head 41 and pistons 80 are moving upwardly to provide suction in cylinders, hot jelly is drawn from manifold 45 through tube 54, rubber tube 69 (while shuttle bar 65 is against rubber tube 99 to prevent air from being sucked through the nozzle and into the cylinders) through tube 71 and elbow 72 into cylinders 78. After the desired volume of fluid is drawn into the jelly cylinder, shuttle bar 65 is caused to move by operation of pneumatic cylinder 61 against rubber tube 69 to cut off the feed of fluid. Jelly piston 80 is then caused to move downwardly to force the fluid through tube 97, into tube 99 and finally through tube 100 to nozzle 101. Of course, it will be appreciated that banks of tubing are involved since all twenty pistons and cylinders operate simultaneously. Referring to FIG. 3, tubings 71 (partially broken away) are shown connected to their respective cylinders 78 while discharge tubings 97 (also partially broken away) are shown extending through bracket 57 via rubber tubing 99 supported by holder 99a and then to tubing 100 connected to multi-nozzle feeding head 41.

As shown in FIG. 3, feeding head 41 is made up of a horizontal member 102 in which a plurality of nozzles 101 are mounted, the feeding head having side members 103 to which are fastened structural members 42 which are connected to sealing assembly 40 as shown in FIG. 1. Since tubings 100 are made of rubber, the feeding head is able to move freely with the reciprocating carriage.

The sealing assembly 40 is fixed to reciprocating bar 30 at the bottom of its side plates 105, 106 (FIGS. 1 and 4), the side plates being rigidly bridged at the top by a horizontal support plate 107 having mounted thereon a pneumatic cylinder 108 with its piston rod 109 connected to horizontal sealing shoe bracket 110. A plurality of sealing shoes 112 are floatingly mounted on bar 111 of the bracket, each of the shoes having an extension 112a passing through bar 111 and biased in the downwardly position via springs 114 surrounding each of the extensions. Each of the shoes have an electrical heating element therein connected by a wire 113, each of the wires being supported by a collector plate 115 and thence connected to a source of electrical power via a variable voltage rheostat not shown. Guide rods fixed to bracket 110 project upwardly through plate 107 and in slidable relationship with bushings 116, 117 mounted on the plate. As shown in FIG. 1, alternate air inlet ports 118 and 119 are provided for pneumatic cylinder 108 to effect raising and lowering of the bank of sealing shoes. Between the shoes and mold 18 (FIG. 4) is shown in cross section a sheet of lidding plastic 120 (FIG. 2) prior to heat sealing it to a plastic tray 18a supported by said mold.

Completing the description of the reciprocable carriage, attention is now directed to knife assembly 39 which is mounted via side plate 121 and 122 (FIGS. 1, 7 and 8) to reciprocating bar 30. A pneumatic cylinder 123 is mounted on side plate 122 and has a piston rod extension 124 in housing 124a connected to a rack 125 which meshes with pinion 126. The pinion is keyed to one end of shaft 127 and sprocket 128 is coaxially keyed to the other end of shaft 127 with its teeth enmeshed with endless chain 129 which passes around two idle toothed wheels 130, 131 rotatably mounted on ears 132, 133 extending from side plates 121, 122. Another toothed wheel 134 is provided mounted on a pivotally supported arm 135 biased at one end by an anchored spring 136 so as to apply tension to the chain by biasing the toothed wheel against the chain as shown in FIGS. 7 and 8. The chain carries a double-edged knife blade 137 mounted in a holder 138 and having a shock absorber 139 at one end. The chain is designed to move to the right during one cutting stroke and then to the left during another cutting stroke. Two alternate air inlet ports 140 and 141 are provided for cylinder 123 to effect the left to right and right to left movement of the chain.

Referring to FIG. 2, a plastic tray is depicted showing twenty cups in two rows of ten covered by plastic film 120. The reciprocating knife 137 is used to separate the two rows of cups along dot and dash line 142. This knife cuts across the interconnecting flange 143 of the cups. In the top view of FIG. 7, these cuts are shown by lines 144.

In addition, stationary cutters 145 (FIG. 1) are provided mounted on the frame. Nine cutters are arranged across the frame and are cantilevered from a pivot so as to keep the blades in continuous cutting association with the flange of the plastic tray. The blades are positioned so as to pass between the kerfs 146 (note FIGS. 3, 4 and 8) which separates one mold cavity from the other of mold 18. Referring to FIG. 1, side supports for the stationary knife assembly are provided comprising elements 147 and 148 on each side of the frame bolted to the outside face of plates 10. Cross bars 149, 150 (FIGS. 5 and 6) are rigidly connected to elements 147 and 148 and extend across the frame just above the conveyor. Ten fingers 151 are connected and located transverse to the cross bars, the fingers being connected via screws 152, 153 as shown in FIGS. 5 and 6. Spaces 154 are provided between the fingers for receiving a knife blade or razor edge 155 held by a holder 156 cantilevered from a bar 157 running across the frame (FIG. 6). In FIG. 5, the bar 157 is shown supported by pillow blocks 158, 159 anchored to the edge of the frame at 160, 161. A pivotally mounted counterweight 162 is provided attached to one end of the bar as shown in FIGS. 1 and 5. The bar supports nine knife holders 156 (FIG. 5), the bar being adapted to rock about its axis by virtue of the counterweight as the knife blades cut into the flanges between the cavities of the plastic tray and react to the cutting resistance of the material. The purpose of the knives is to sever the plastic tray along lines 142a shown in FIG. 2 and in FIG. 5. Thus, as the plastic trays supported by molds 18 move along the conveyor with plastic film 120 sealed to the top thereof, they are cut along lines 142a as shown in FIG. 5 and thereafter cut crosswise along lines 144 of FIG. 7 to produce the unit package of FIG. 2A.

In operating the pneumatic pistons at the various stations of the device in timed sequence with the reciprocating carriage, rotating cams are employed associated with microswitches. Referring to FIG. 1, cams 165, 166 and 167 are shown mounted on a rotatable shaft 168 having a bevel gear 169 driven by bevel gear 170 which is coaxially mounted on a pulley 171 driven by a belt 172 coupled to pulley 173. Pulley 173 is coaxially mounted with toothed wheel 174 which meshes with toothed wheel 38 mounted on shaft 19. As cams 165, 166 and 167 rotate, they activate microswitches 175, 176 and 177 which in turn actuate respective air by-pass valves of the type shown in FIG. 9 via an electrically operable solenoid (shown diagrammatically) biased in one position. As shown in FIG. 9, with valve rod 178 in the position shown air enters openings 179 and 180 and is directed through opening 181 through a tube (not shown) to one side of the pneumatic cylinder. When valve rod 178 is caused to move to the left, opening 181 is cut off and the air is passed through opening 182 and from there to another side of the pneumatic cylinder. Following the dotted lines in FIG. 1, it will be noted that microswitch 175 operates pneumatic cylinder 108, microswitch 176 operate cylinder 83 and switch 177 to cylinder 61. In addition to the foregoing cams, another set of cams 185, 186 are provided mounted on a separate shaft coupled via gear 187 to gear 188 mounted on the end of shaft 168. The two cams which operate cutting assembly 39 via an air valve solenoid (diagrammatically shown) through the agency of microswitch 189, 190 are 180° apart in phase so as to effect cutting in two directions, that is left to right in FIG. 8 during one cycle, and right to left during another cycle.

The operation of the device is as follows:

As endless conveyor 16 moves continuously from station A to station B (FIG. 1), plastic trays (FIG. 2) are fitted to mold 18 at station A and the trays continuously move towards multi-nozzle head 41. Meanwhile, the carriage reciprocates via reciprocating bar 30, the forward motion of the carriage being in synchrony with that of the conveyor. The cams which are indirectly coupled to the drive of the conveyor are in the meantime rotating and are timed to effect displacement of the pistons in the various pneumatic cylinders at the respective stations. The filling, sealing and cutting up of one tray will now be described, it being understood that all three operations are going on simultaneously once the device is fully loaded with trays. As a mold 18 with its plastic tray approaches feeding head 41, the feeding head is in the state of moving backward as part of the movement of the carriage. Simultaneously, jelly pistons 80 move upwardly to admit a charge of fluid from manifold 45 to volumetric cylinders 78 via tube 54 as shuttle bar 65 closes against collapsible clamp tubes 99. This closing prevents suction of air to cylinders via discharge nozzles 101 through tubes 99 and 97. As the feeding head reaches the end of its backward travel (that is to the right of FIG. 1) it lies directly over the moving mold and is centered over the individual plastic cups. Now, as the feeding head starts to move forward with a particular mold, microswitch 177 is actuated so that shuttle bar 65 is moved against collapsible clamp tubes 69. Simultaneously, microswitch 176 is actuated so that jelly pistons 80 are moved downwardly into cylinders 78 to push out the fluid through discharge tubes 97. Thus, flow of the measured fluid is blocked from passage back to manifold 45 via tubes 71, 69 and 54 and, instead, is ejected via tubes 97, 99 (now open) and 100. Fluid is then discharged into the cups of the plastic tray through nozzles 101.

As the filled trays move forwardly past the feeding head, plastic film 120 is drawn off roll 29 down around guide roll 191 to and around guide roll 192 mounted on the frame back of sealing assembly 105 just above the molds. Once the plastic film has been sealed to a plastic tray, the forward movement of the mold supporting the tray provides the necessary pull to continue feeding the film to the top of consecutive molds. Referring to FIG. 4, when the filled tray reaches the sealing assembly, microswitch 175 is actuated to cause sealing bracket 110 to move downwardly and heat press film 120 to the top of the tray and seal it in place. It is to be understood that since the sealing assembly is supported by the carriage and reciprocates with the carriage, sealing assembly contacts the tray at the end of its backward movement and then moves forwardly with the tray while sealing is being effected. Simultaneously with the sealing, another tray is being filled at the feeding station.

The sealed tray continues to move forwardly, and passes under stationarily fixed fingers 151 (FIGS. 5 and 6) to cutting blades 155 where the sealed plastic film is continuously slit along lines 142a. At the same time, the cups of the tray are severed in pairs along their flanges along lines 142a (note FIG. 2). When the partially cut tray reaches moving cutting assembly 39 which has moved to its back position with the backward movement of the carriage, microswitch 189 is actuated by cam 185 as cutting assembly 39 moves forward with the carriage and the tray. Knife 137 (FIG. 8) is caused to move to the right to cut the tray along line 142 of FIG. 2. The knife stays on the right side of the cutting assembly until the assembly moves back with the carriage to align itself with another tray. As the carriage moves forward, cam 186 which is 180° out of phase with cam 185 now actuates the reverse end of an air valve solenoid (diagrammatically shown) which moves into knife 137 to the left of the assembly shown in FIG. 8.

As stated above, once the device reaches a continuously operating state, each operation is carried out simultaneously with the other. Thus, as fluid is being fed in a tray, another tray is being simultaneously sealed while a still further tray is being severed into unit packages.

As the filled and sealed packages supported by molds 18 reach Station B, an attendant slips a box over the mold containing the individual packages corresponding to a tray of twenty and as the conveyor reaches the underside of the frame, the boxes, with their twenty packages each are detached by gravity from the inverted molds and are deposited on a second continuously moving conveyor chain 193 driven by gearing from the same drive operating conveyor 16. The conveyor comprises a pair of spaced apart chains riding grooves in a support 194 extending from one end of the frame to the other. The conveyor is close to and is inclined downwardly slightly from the bottom of conveyor 16 so that the boxes 195 are gently released from the molds and deposited on conveyor 193 from which they are removed at the discharge end.

While the present invention has been described in conjunction with preferred embodiments, it is to be understood that modifications and variations may be resorted to without departing from the spirit and scope of the invention as those skilled in the art will readily understand. Such modifications and variations are considered to be within the purview and scope of the invention and the appended claims.

It is claimed:

1. A device for continuously feeding and packaging flowable substances which comprises:
   a frame,
   an endless conveyor supported by said frame and extending from a charging station at one end of said frame to the end opposite thereof and back to said charging station,
   a reciprocable carriage mounted on said frame,
   said carriage having mounted thereon a feeding head for feeding flowable substance to a package supported by said conveyor, and a heat sealing assembly spaced forwardly of said feeder for applying and sealing a cover on said package,
   a feeding assembly supported by said frame comprising,
      a reservoir for confining flowable substance therein,
      a feeding tube communicating with and extending from said reservoir,
      a measuring device having an inlet port and an outlet port,
      means connecting said feeding tube to the inlet port of said device,
      a discharge tube connected to the outlet port of said device,
      means coupling the end of said discharge tube to said feeding head,
      valve means associated with said feeding tube and said discharge tube for alternately closing off either of said tubes,
      means for actuating said valve means,
   means for actuating said measuring device for drawing flowable substance into it through the inlet port thereof and for discharging the same through the outlet port,
   and means for actuating said feeding assembly and said sealing assembly in timed relationship with the reciprocable movement of said carriage.

2. A device for continuously feeding and packaging flowable substances which comprises,
   a frame,
   an endless conveyor supported by said frame and extending from a charging station at one end of said frame to the end opposite thereof and back to said charging station,
   a reciprocable carriage mounted on said frame,
      said carriage having mounted thereon above said conveyor starting at the charging station a feeding head containing a bank of discharge nozzles for feeding flowable substance to flange-connected packages supported by said conveyor,
      a heat sealing assembly spaced forwardly of said feeder for applying and sealing a cover to said flange-connected packages, and a cutting assembly forwardly of said sealing assembly for severing said packages into unit packages, a feeding assembly supported by said frame comprising, a reservoir for confining flowable substance therein, a bank of feeding tubes communicating with and extending from said reservoir, a bank of measuring devices, each of said measuring devices having an inlet port and an outlet port, means connecting said bank of feeding tubes to corresponding inlet ports of said measuring devices, a bank of discharge tubes connected to corresponding outlet ports of said measuring devices, means coupling the ends of said bank of discharge tubes to a corresponding bank of discharge nozzles of said feeding head, valve means associated with said feeding tube and said discharge tube alternately closing off either of said tubes, means for actuating said valve means, means for actuating said bank of measuring devices for drawing flowable substance therein through the inlet ports thereof and for discharging the same through the outlet ports, and means for actuating said feeding assembly, said sealing assembly and said cutting assembly in timed relationship with the reciprocable movement of said carriage.

3. A device for continuously feeding and packaging flowable substances which comprises, a frame, an endless conveyor supported by said frame and extending from a charging station at one end of said frame to the end opposite thereof and back to said charging station, a reciprocable carriage mounted on said frame, said carriage having mounted thereon above said conveyor starting at the charging station a feeding head containing a bank of discharge nozzles for feeding flowable substance to flange-connected packages supported by said conveyor, a heat sealing assembly spaced forwardly of said feeder for applying and sealing a cover on said flange-connected packages, and a cutting assembly forwardly of said sealing assembly for severing said packages into unit packages a feeding assembly supported by said frame comprising, a reservoir for confining flowable substance therein, a bank of feeding tubes communicating with and extending from said reservoir, a portion of each of said tubes being made of collapsible elastomeric material, a measuring device comprising a bank of volumetric cylinders and associated pistons, each of said cylinders having an inlet port and an outlet port, means connecting said bank of feeding tubes to corresponding inlet ports of said cylinders, a bank of discharge tubes connected to corresponding outlet ports of said cylinders, a portion of each of said tubes being made of collapsible elastomeric material disposed opposite to the collapsible portions of said bank of feeding tubes, means coupling the ends of said bank of discharge tubes to a corresponding bank of discharge nozzles of the feeding head, a shuttle bar valve located intermediate the collapsible portions of said banks of feeding tubes and discharge tubes, means for actuating said shuttle valve for impinging on and alternately closing off either of the bank of collapsible portions of the feeding tubes or the discharge tubes, means for actuating said measuring device for drawing flowable substance into the bank of volumetric cylinders through the inlet ports thereof and for discharging the same through the outlet ports, and means for actuating said feeding assembly, said sealing assembly and said cutting assembly in timed relationship with the backward and forward movement of said carriage.

4. A device for feeding measured amounts of a fluid to a filling station which comprises, a manifold for confining a fluid therein, a feeding tube communicating with and extending from said manifold, a portion of said tube being made of collapsible elastomeric material, a volumetric cylinder and piston combination, said cylinder having an inlet port and an outlet port, means connecting the extending portion of said feeding tube to the inlet port of said cylinder, means for actuating the piston for drawing fluid by suction to the cylinder and later for discharging it, a discharge tube connected to the outlet port and extending in spaced relationship to said feeding tube, said discharge tube having a portion made of collapsible elastomeric material disposed opposite to the collapsible portion of said feeding tube, a shuttle bar valve located intermediate the collapsible portions of said feeding and discharge tubes, means for actuating said shuttle bar for impinging on and alternately closing either of the collapsible portions of said tubes, said actuating means being operated in timed sequence with means actuating the piston such that as fluid is sucked into the volumetric cylinder on the upstroke of the piston, the shuttle bar valve is actuated to close off the collapsible portion of the discharge tube, and when the fluid is discharged from the cylinder on the downstroke, the shuttle bar valve is actuated to close off the collapsible portion of the feeding tube.

5. A device for feeding measured amounts of a liquid to a filling station which comprises, a manifold for confining liquid therein, a bank of feeding tubes communicating with and extending from said manifold, a portion of each of said tubes being made of collapsible elastomeric material, a measuring device comprising a bank of volumetric cylinders and pistons each of said cylinders having an inlet port and an outlet port, means connecting the bank of feeding tubes to corresponding inlet ports of said cylinders, means for actuating the pistons for drawing fluid by suction to each of said cylinders and later for discharging it, a bank of discharge tubes connected to the outlet ports and extending in spaced relationship to said feeding tubes, each of said discharge tubes having a portion made of collapsible elastomeric material disposed opposite to corresponding collapsible portions of said feeding tubes, a shuttle bar valve located intermediate the collapsible portions of said feeding and discharge tubes, means for actuating said shuttle bar for impinging on and alternately closing either of the collapsible portions of said tubes, said actuating means being operated in timed sequence with means actuating the pistons such that as fluid is sucked into each of the volumetric cylinders on the upstroke of the piston, the shuttle bar valve is actuated to close off the collapsible portion of the discharge tube, and when the fluid is discharged from the cylinders, on the downstroke, the shuttle bar valve is actuated to close off the collapsible portion of the feeding tube.

References Cited
UNITED STATES PATENTS 2,706,950 4/1955 Becker _____ 222—409
2,771,225 11/1956 Perkins _____ 222—255
3,193,978 7/1965 Bader _____ 53—282

TRAVIS S. McGEHEE, *Primary Examiner.*

FRANK E. BAILEY, *Examiner.*

R. L. FARRIS, *Assistant Examiner.*